(12) United States Patent
Hartzel et al.

(10) Patent No.: US 7,586,738 B1
(45) Date of Patent: Sep. 8, 2009

(54) CHIMNEY ASSEMBLY, AND ELECTRICAL SWITCHING APPARATUS AND ELECTRICAL ENCLOSURE EMPLOYING SAME

(75) Inventors: Ronald D. Hartzel, Butler, PA (US); James E. Smith, Pittsburgh, PA (US); Douglas M. Brandt, Wampum, PA (US); Anthony T. Ricciuti, Bethel Park, PA (US); James J. Benke, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 12/116,504

(22) Filed: May 7, 2008

(51) Int. Cl.
*H02B 1/00* (2006.01)
*H05K 7/20* (2006.01)

(52) U.S. Cl. ...................... 361/676; 361/690
(58) Field of Classification Search ............... 361/676
See application file for complete search history.

(56) References Cited

U.S. PATENT DOCUMENTS

| | | | |
|---|---|---|---|
| 3,793,562 A * | 2/1974 | Cleaveland | 361/678 |
| 4,024,441 A | 5/1977 | Coyle et al. | |
| 4,110,580 A | 8/1978 | Farish | |
| 4,327,396 A * | 4/1982 | Schacht | 361/676 |
| 4,464,703 A * | 8/1984 | Davies et al. | 361/614 |
| 4,472,761 A | 9/1984 | Koslosky et al. | |
| 5,193,049 A * | 3/1993 | Jackson | 361/676 |
| 5,657,641 A * | 8/1997 | Cunningham et al. | 62/263 |
| 6,018,455 A * | 1/2000 | Wilkie, II et al. | 361/676 |
| 6,067,223 A * | 5/2000 | Diebel et al. | 361/676 |
| 6,643,123 B2 * | 11/2003 | Hartel et al. | 361/678 |
| 6,856,503 B2 * | 2/2005 | Apfelbacher et al. | 361/676 |
| 7,140,702 B2 * | 11/2006 | Byron et al. | 312/296 |
| 2004/0007951 A1 * | 1/2004 | Holighaus et al. | 312/265.4 |
| 2005/0280989 A1 * | 12/2005 | Hinzpeter et al. | 361/695 |
| 2006/0012954 A1 * | 1/2006 | Jur et al. | 361/695 |

* cited by examiner

*Primary Examiner*—Gregory D Thompson
(74) *Attorney, Agent, or Firm*—Martin J. Moran

(57) ABSTRACT

A chimney assembly is provided for an electrical switching apparatus, such as a circuit breaker including a housing and a number of poles. The chimney assembly includes a frame, an intake, a duct and an exhaust. A first side of the frame is coupled to the circuit breaker housing proximate the poles of the circuit breaker, and the intake and exhaust are respectively disposed at first and second ends of the frame. A first portion of the duct is coupled to the circuit breaker housing above the poles, and a second portion is coupled to the first side of the frame. The chimney assembly draws a volume of air through the intake into the circuit breaker housing, circulates the volume of air through the poles of the circuit breaker, and discharges the volume of air out of the circuit breaker housing through the duct and the exhaust.

20 Claims, 5 Drawing Sheets

CHIMNEY ASSEMBLY, AND ELECTRICAL SWITCHING APPARATUS AND ELECTRICAL ENCLOSURE EMPLOYING SAME

BACKGROUND OF THE INVENTION

1. Field of the Invention

The invention relates generally to electrical switching apparatus and, more particularly, to chimney assemblies for electrical switching apparatus, such as circuit breakers. The invention also relates to electrical switching apparatus. The invention further relates to electrical enclosures.

2. Background Information

Electrical equipment such as, for example and without limitation, relays, circuit breakers, electric meters and transformers, are typically housed within an enclosure such as, for example, a housing, such as a box or cabinet, to protect the electrical equipment. When such electrical equipment is disposed outdoors, it must be protected from the environment, for example, to prevent electrical faults caused by moisture. Accordingly, outdoor electrical enclosures are generally designed to be moisture-resistant.

Regardless of where the electrical equipment and the electrical enclosure housing the electrical equipment are disposed (e.g., indoors; outdoors), the electrical equipment must at least meet and preferably exceed certain predetermined industry standards (e.g., without limitation, safety regulations). For example, one such industry standard for circuit breakers that are housed within an electrical enclosure relates to the maximum allowable operating temperature of the circuit breaker. Specifically, the temperature of certain portions (e.g., without limitation, the pole(s)) of the circuit breaker must be maintained at or below a predetermined threshold temperature for a designated electrical current level. Accordingly, it is desirable to improve the thermal performance of the circuit breaker to increase the allowable electrical current level (e.g., current rating) while maintaining or reducing the temperature that the circuit breaker exhibits when conducting the current.

There is, therefore, room for improvement in electrical switching apparatus, such as circuit breakers, and in assemblies structured to cool electrical switching apparatus. There is also room for improvement in electrical enclosures for housing electrical switching apparatus.

SUMMARY OF THE INVENTION

These needs and others are met by embodiments of the invention, which are directed to a chimney assembly for cooling an electrical switching apparatus through passive and/or active ventilation, thereby enhancing the thermal performance of the electrical switching apparatus.

As one aspect of the invention, a chimney assembly is provided for an electrical switching apparatus. The electrical switching apparatus comprises a housing and a number of poles generally disposed within the housing. The chimney assembly comprises: a frame including a first end, a second end disposed opposite and distal from the first end, a first side and a second side disposed opposite the first side, the first side of the frame being structured to be coupled to the housing of the electrical switching apparatus proximate to the number of poles of the electrical switching apparatus; an intake disposed proximate the first end of the frame; a duct including a first portion, a second portion and an intermediate portion disposed between the first portion and the second portion, the first portion of the duct being structured to be coupled to the housing of the electrical switching apparatus above the number of poles, the second portion of the duct being coupled to the first side of the frame; and an exhaust disposed proximate the second end of the frame opposite from the second portion of the duct. The chimney assembly is structured to draw a volume of air through the intake into the housing of the electrical switching apparatus, to circulate the volume of air through the number of poles of the electrical switching apparatus, and to discharge the volume of air out of the housing of the electrical switching apparatus through the duct and the exhaust.

The intermediate portion of the duct may be disposed at an angle with respect to the first side of the frame. The angle may be less than about 75 degrees. The second portion of the duct may comprise a pair of opposing side walls extending perpendicularly outwardly from the first side of the frame, and the intermediate portion of the duct may comprise a panel member coupled to the pair of opposing side walls. The panel member may be structured to enclose the duct, thereby forming a passageway for the volume of air to pass from the housing of the electrical switching apparatus to the exhaust.

The intake may comprise a first duct element structured to extend from the second side of the frame through the frame toward the number of poles of the electrical switching apparatus. The exhaust may comprise a second duct element extending from the second side of the frame through the frame toward the second portion of the duct of the chimney assembly. At least one of the intake and the exhaust may further comprise a fan, wherein the fan is structured to facilitate circulation of the volume of air through the number of poles of the electrical switching apparatus. The intake may further comprise a first hood coupled to the first duct element at or about the second side of the frame proximate the first end of the frame, and the exhaust may further comprise a second hood coupled to the second duct element at or about the second side of the frame proximate the second end of the frame. At least one of the intake and the exhaust may be removably coupled to the frame.

As another aspect of the invention, an electrical switching apparatus comprises: a housing including a top and a plurality of sides extending outwardly from the top, the top having a duct opening; a number of poles including separable contacts, the number of poles being generally enclosed by the housing beneath the duct opening of the top of the housing; an operating mechanism structured to open and close the separable contacts; and a chimney assembly comprising: a frame including a first end, a second end disposed opposite and distal from the first end, a first side and a second side disposed opposite the first side, the first side of the frame being coupled to the housing proximate the number of poles, an intake disposed proximate the first end of the frame, a duct including a first portion, a second portion and an intermediate portion disposed between the first portion and the second portion, the first portion of the duct being coupled to the top of the housing above the number of poles, the second portion of the duct being coupled to the first side of the frame, and an exhaust disposed proximate the second end of the frame opposite from the second portion of the duct. The chimney assembly draws a volume of air through the intake into the housing, circulates the volume of air through the number of poles, and discharges the volume of air out of the duct opening of the top of the housing through the duct of the chimney assembly and the exhaust.

The electrical switching apparatus may be a circuit breaker, and the number of poles may be a plurality of poles. The plurality of poles may be structured to conduct electrical current and, responsive to the plurality of poles conducting electrical current, the circuit breaker may generate heat wherein the chimney assembly circulates the volume of air through the plurality of poles, and discharges the volume of air through the exhaust, thereby dissipating the heat.

As a further aspect of the invention, an electrical enclosure is provided. The electrical enclosure comprises: a base; a cover coupled to the base, the cover including a top and a plurality of walls extending outwardly from the top of the cover toward the base; an electrical switching apparatus coupled to the base beneath the cover, the electrical switching apparatus comprising: a housing, a number of poles including separable contacts, the number of poles being generally enclosed by the housing, an operating mechanism structured to open and close the separable contacts, and a chimney assembly comprising: a frame including a first end, a second end disposed opposite and distal from the first end, a first side and a second side disposed opposite the first side, the first side of the frame being coupled to the housing of the electrical switching apparatus proximate the number of poles, an intake disposed proximate the first end of the frame, a duct including a first portion, a second portion and an intermediate portion disposed between the first portion and the second portion, the first portion of the duct being coupled to the housing above the number of poles, the second portion of the duct being coupled to the first side of the frame, and an exhaust disposed proximate the second end of the frame opposite from the second portion of the duct. The chimney assembly draws a volume of air through the intake into the housing of the electrical switching apparatus, circulates the volume of air through the number of poles of the electrical switching apparatus, and discharges the volume of air out of the housing of the electrical switching apparatus through the duct and the exhaust.

The second side of the frame of the chimney assembly may comprise a door, and at least one of the walls of the cover may include an opening. When the electrical switching apparatus is disposed within the electrical enclosure, the door may be disposed in the opening. The door may be movable between an open position for providing access to the electrical switching apparatus, and a closed position.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
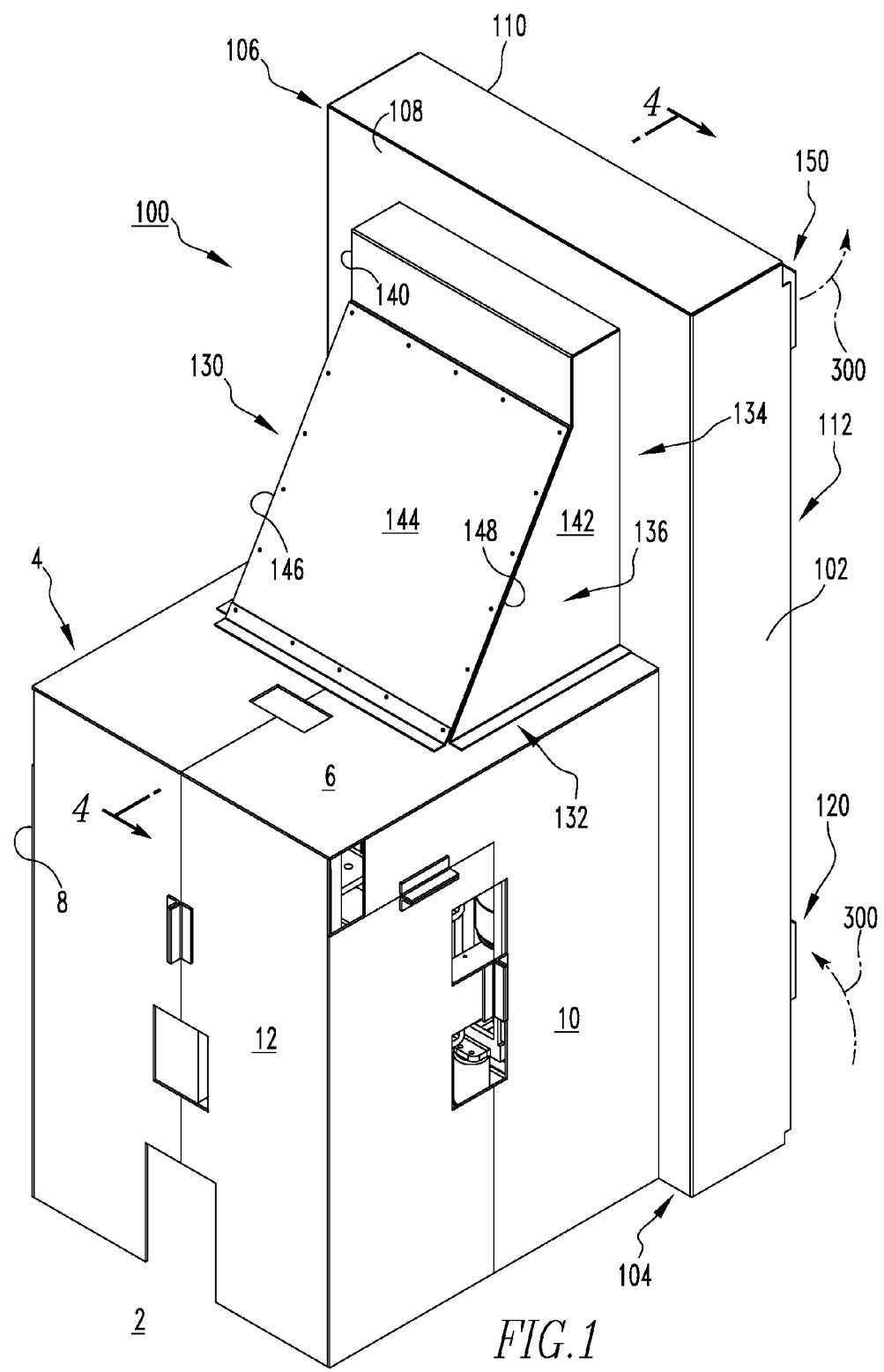
FIG. 1 is an isometric view of a chimney assembly for a circuit breaker, in accordance with an embodiment of the invention.

Directional phrases used herein, such as, for example, left, right, front, back, top, bottom and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, rivets, screws, bolts and the combinations of bolts and nuts (e.g., without limitation, lock nuts) and bolts, washers and nuts, as well as connecting mechanisms that do not require a separate fastening element (e.g., without limitation, a rivet; a screw; a bolt and a nut; a combination of bolts, washers and nuts) such as, for example and without limitation, an arrangement interlocking protrusions (e.g., without limitation, tabs) and openings (e.g., without limitation, recesses; holes; slots).

As employed herein, the term "tox-lock" refers to a fastening mechanism in which a mechanical weld is created by metal deformation such as, for example, at the corners, edge portions and seams of a metallic cabinet, which are folded and deformed to create mechanical welds therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 3:
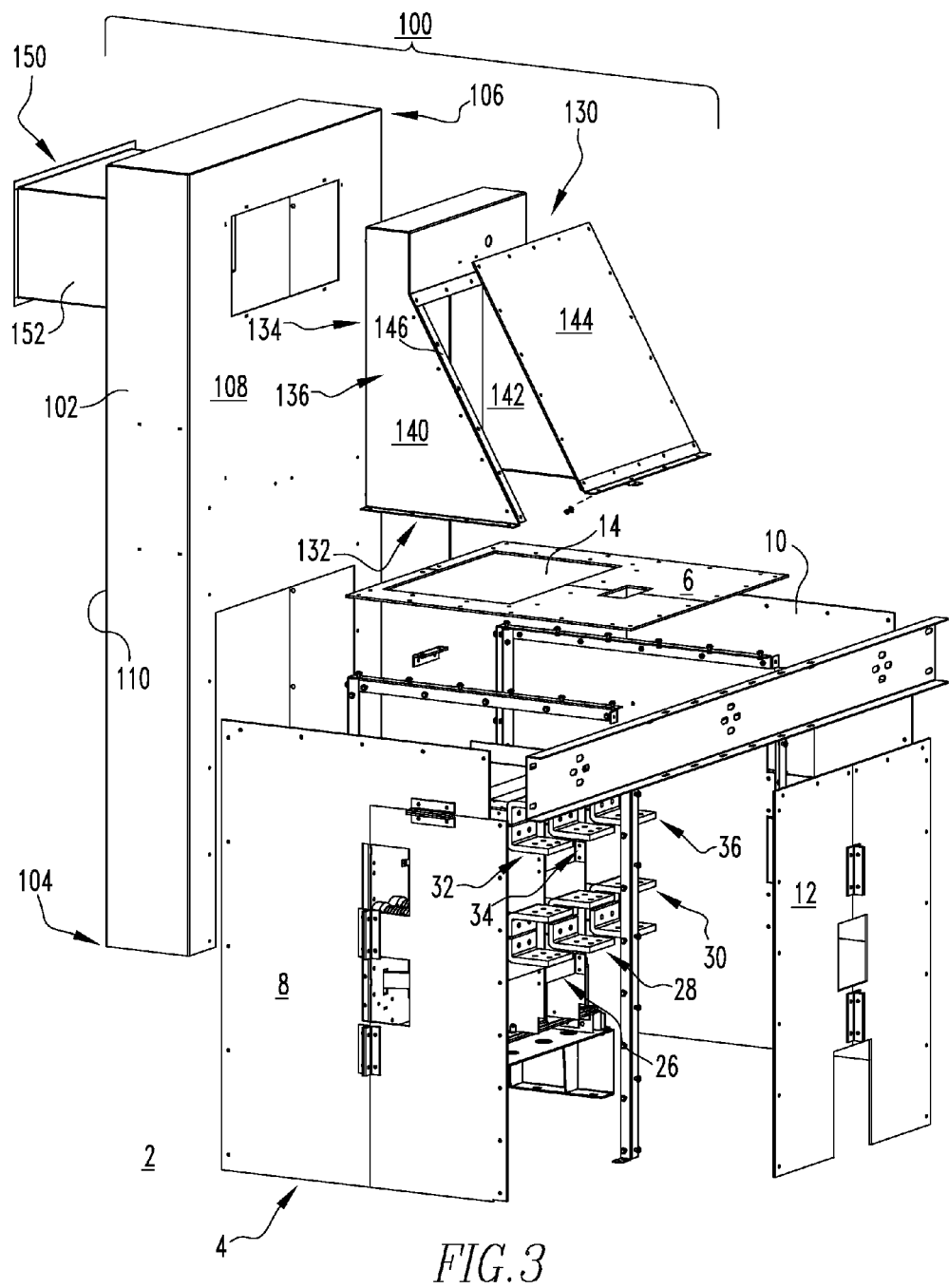
FIG. 3 is an exploded isometric view of the chimney assembly of FIG. 2, also showing a portion of the circuit breaker.
Figure 4:
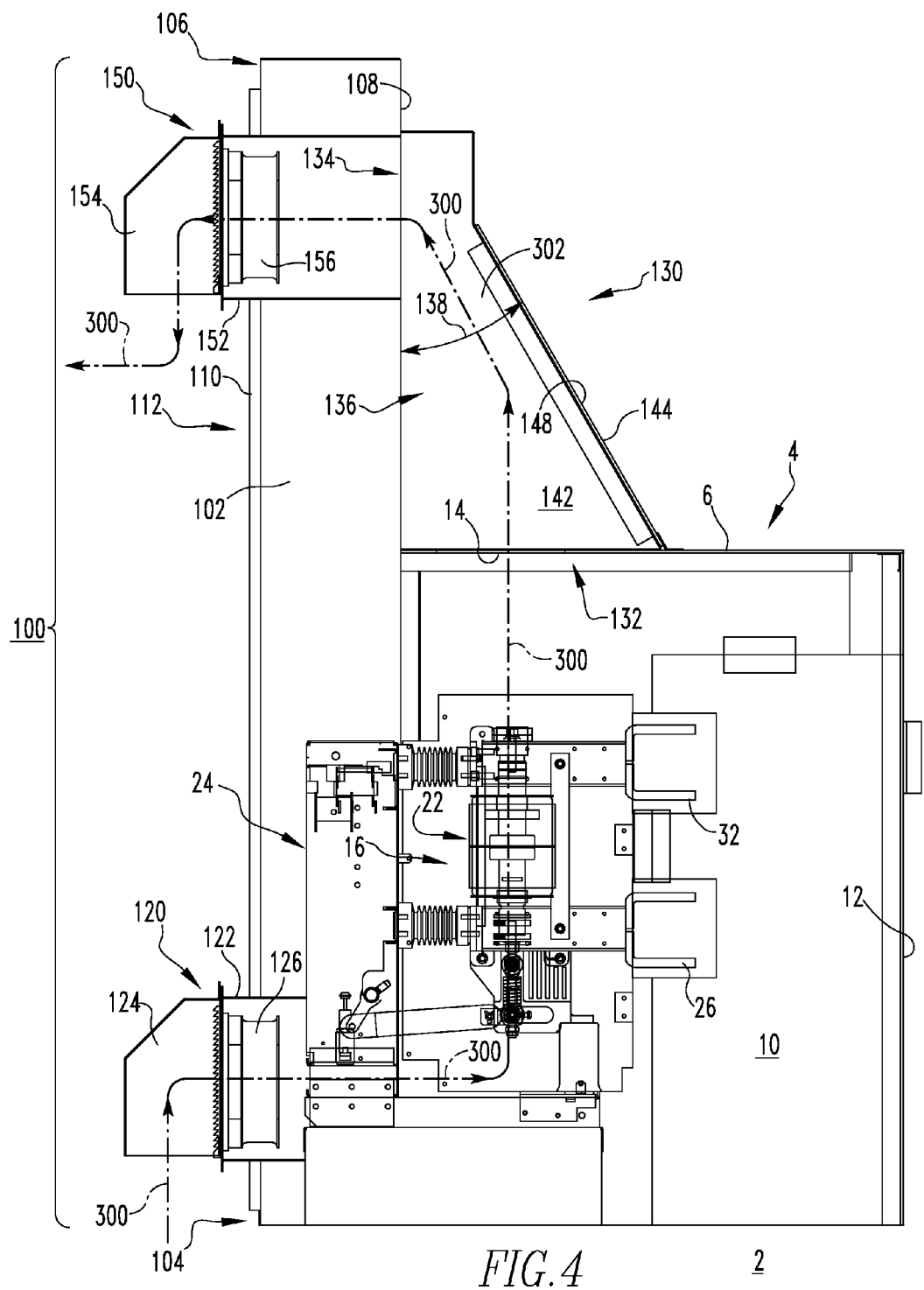
FIG. 4 is a sectional view taken along line 4-4 of FIG. 1.
Figure 5:
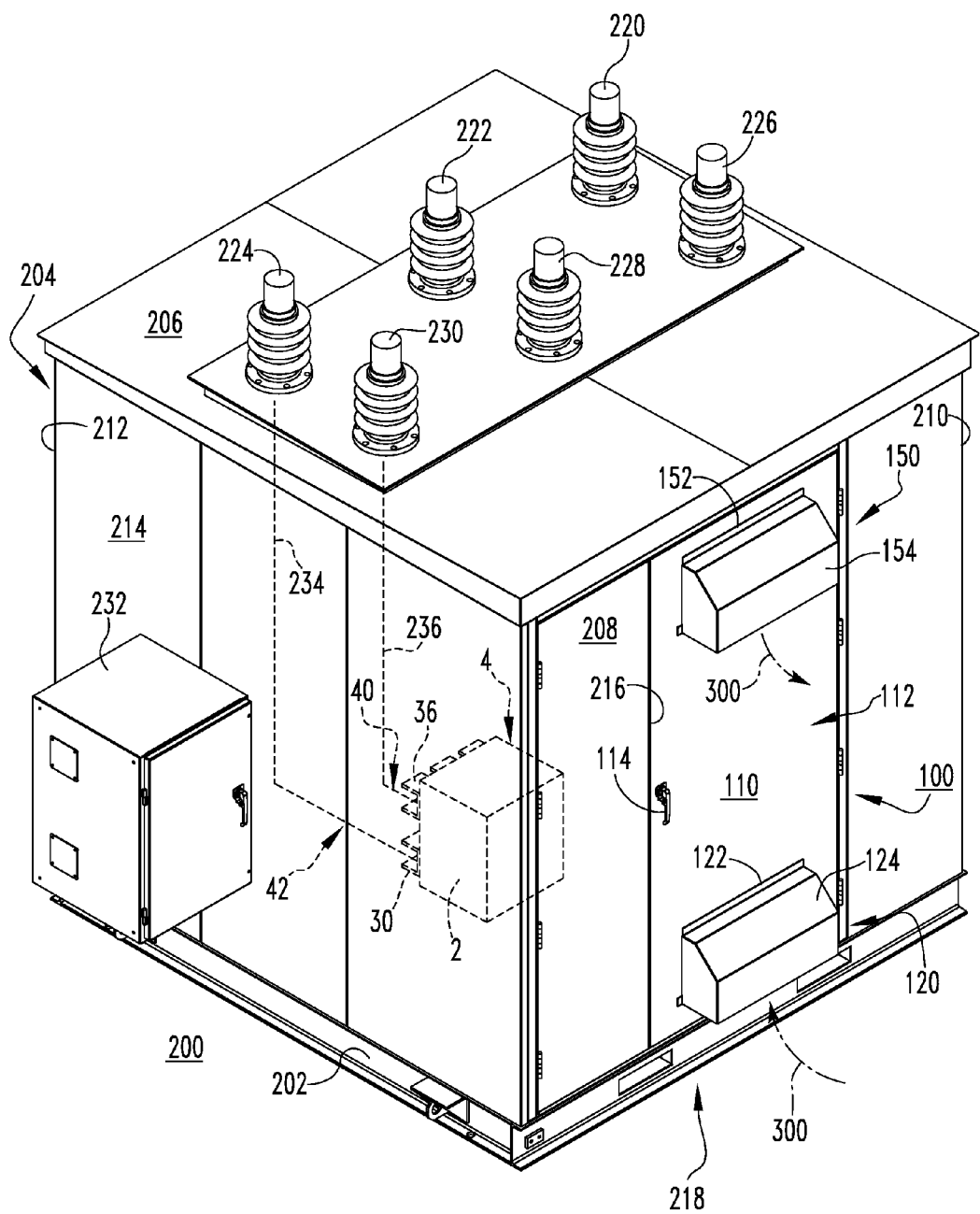
FIG. 5 is an isometric view of an electrical enclosure, in accordance with another embodiment of the invention.

FIGS. 1-5 show a chimney assembly 100 (partially shown in FIG. 5) for an electrical switching apparatus, such as a circuit breaker 2 (shown in simplified form in hidden line drawing in FIG. 5). As will be discussed, the chimney assembly 100 is structured to receive a volume of air (indicated generally by arrows 300 of FIGS. 1, 4 and 5), to circulate the volume of air 300 (FIGS. 1, 4 and 5) through a housing 4 (shown in simplified form in hidden line drawing in FIG. 5) of the circuit breaker 2 and, ultimately, to discharge the volume of air 300. In this manner, the chimney assembly 100 functions to dissipate heat, which is generated by the circuit breaker 2 when it is conducting electrical current. Consequently, the thermal performance of the circuit breaker 2 is improved, because its operating temperature is reduced. Thus, it will be appreciated that the disclosed chimney assembly 100 enables the same circuit breaker 2 to achieve a higher current rating than it would otherwise enjoy absent the chimney assembly 100.

Figure 2:
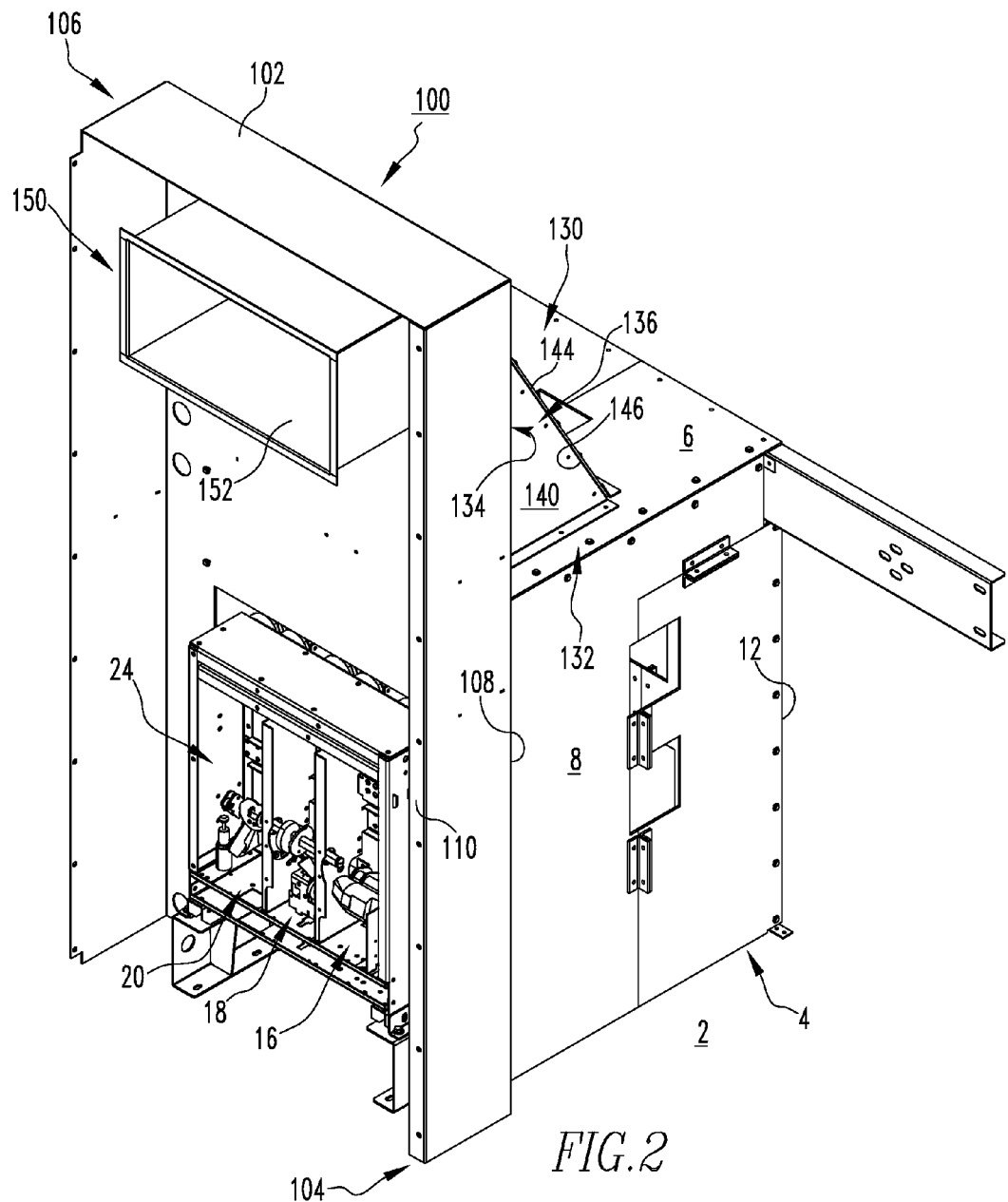
FIG. 2 is an isometric view of the opposite side of the chimney assembly of FIG. 1, with the cover of the chimney assembly removed to show internal structures.

As shown in FIGS. 2-4, in addition to the aforementioned housing 4, the circuit breaker 2 includes a number of poles (three poles 16,18,20 are shown in FIG. 2; one pole 16 is shown in the sectional view of FIG. 4) and an operating mechanism (indicated generally by reference numeral 24 in FIGS. 2 and 4), which is structured to open and close separable contacts 22 (FIG. 4) of the circuit breaker 2, for example in response to a trip condition (e.g., without limitation, a short circuit condition; an overload condition). It will, however, be appreciated that the disclosed chimney assembly 100 could be employed with any known or suitable electrical switching apparatus other than the three-pole circuit breaker 2 shown and described herein, without departing from the scope of the invention. The housing 4 of the example circuit breaker 2 includes a top 6 and a plurality of sides 8,10,12 (all shown in exploded relation to one another in FIG. 3), which extend outwardly (e.g., downward from the perspective of FIGS. 1-4) from the top 6. The top 6 of the circuit breaker housing 4 includes a duct opening 14 (best shown in FIG. 3).

The example chimney assembly 100 includes a frame 102 having opposing first and second ends 104,106 and opposing first and second sides 108,110. The first side 108 of the frame 102 is coupled to the opposing sides 8 and 10 (both shown in FIG. 3) of the circuit breaker housing 4, proximate the poles 16,18,20 (all shown in FIG. 2) of the circuit breaker 2. As best shown in FIG. 4, the chimney assembly 100 further includes an intake 120, which is disposed proximate the first end 104 of the frame 102, a duct 130, which is disposed between the top 6 of the circuit breaker housing 4 and the first side 108 of the frame 102, and an exhaust 150, which is disposed proximate the second end 106 of the frame 102 opposite the duct 130. As will be described in greater detail hereinbelow, the duct 130 includes a first portion 132, a second portion 134 and an intermediate portion 136 that is disposed between the first and second portions 132,134, as shown. The first portion 132 of the duct 130 is coupled to the top 6 of the circuit breaker housing 4 above the poles (one pole 16 is shown in FIG. 4) of the circuit breaker 2. The second portion 134 of the duct 130 is coupled to the first side 108 of the frame 102, as shown.

As represented in simplified form in phantom line drawing as reference number 300 in FIG. 4, the chimney assembly 100 draws the volume of air 300 through the intake 120 into the circuit breaker housing 4, circulates the volume of air 300 through the poles (one pole 16 is shown in FIG. 4) of the circuit breaker 2, and discharges the volume of air 300 out through the duct opening 14 of the circuit breaker housing 4 through the passageway 302 provided by duct 130 and the exhaust 150. Thus, it will be appreciated that the volume of air 300 is circulated directly through the poles (see, for example, pole 16 of FIG. 4) of the circuit breaker 2, thereby reducing the operating temperature of the circuit breaker 2. Specifically, the flow path of the volume of air 300 functions to dissipate heat generated by the circuit breaker 2 and, in particular, the poles (see, for example, pole 16 of FIG. 4) thereof, by carrying the heat upward (e.g., from the perspective of FIG. 4) into the duct 130 and out of the exhaust 150. In this manner, the heat is removed from the circuit breaker housing 4.

It will be appreciated that circulation of the volume of air 300 can be effectuated by passive convection, alone, and/or in combination with active circulation of the volume of air 300, for example, through the use of a number of suitable fans 126 and 156. Although two fans 126 and 156, one for each of the intake 120 and exhaust 150, respectively, of the chimney assembly 100, are shown, any known or suitable type, number and/or configuration of fans or other suitable mechanisms for facilitating airflow through the circuit breaker housing 4 could be employed within the scope of the invention.

In order to further improve efficiently and effectively the circulation of the volume of air 300 and, in particular, to resist undesirable dead spots (e.g., locations of stagnant air within the chimney assembly 100) and/or turbulence, the duct 130 of the example chimney assembly 100 includes an intermediate portion 136, which is disposed at an angle 138 with respect to the first side 108 of the frame 102, as shown. In one non-limiting example embodiment, such angle 138 is less than about 75 degrees. This duct configuration (e.g., angle 138) functions to provide the aforementioned passageway 302 for the volume of air 300, which efficiently and effectively directs the volume of air 300 from the circuit breaker housing 4 to the exhaust 150 of the chimney assembly 100, thereby overcoming the aforementioned disadvantages (e.g., without limitation, dead spots; turbulence).

Referring again to FIG. 3, the second portion 134 of the example duct 130 includes a pair of opposing side walls 140,142, which extend perpendicularly outwardly from the first side 108 of the frame 102. The intermediate portion 136 of the duct 130 in the example of FIG. 3, is a panel member 144, which is suitably coupled to the pair of opposing side walls 140,142, for example and without limitation, using any known or suitable fastener(s), as defined herein. Accordingly, the panel member 144 encloses the duct 130, to form the passageway 302 (FIG. 4), previously discussed. It will be appreciated that, as with the panel member 144 of the duct 130, all of the components (e.g., without limitation, frame 102; circuit breaker housing 4) associated with the chimney assembly 100 can be coupled together using any known or suitable fastener, or alternative securing mechanism or process (e.g., without limitation, tox-lock).

Referring again to FIG. 4, and also to FIG. 5, the second side 110 of the frame 102 of the example chimney assembly 100 is a door 112, which is movable between an open position (not shown; but see FIG. 2 wherein the door (not shown) has been removed) for providing access to the circuit breaker 2, and a closed position (shown). More specifically, in one non-limiting embodiment of the invention, which is illustrated in FIG. 5, the circuit breaker 2 and chimney assembly 100 therefor, can be employed with any suitable electrical enclosure, such as 200. In the example of FIG. 5, the electrical enclosure 200 includes a base 202 and a cover 204 coupled to the base 202. The cover 204 includes a top 206 and a plurality of walls 208,210,212,214 extending outwardly (e.g., downward from the perspective of FIG. 5) from the top 206 toward the base 202. The circuit breaker 2, which is shown in simplified form in hidden line drawing in FIG. 5, is disposed beneath the cover 204. Wall 208 of the cover 204 includes an opening 216. When the circuit breaker 2 is disposed within the electrical enclosure 200, the door 112 is disposed in the opening 216 of wall 208 so as to be generally flush with respect to the remainder of the wall 208, as shown. Thus, the door 112, which in the example shown includes a handle 114, provides a mechanism for enabling access to the circuit breaker 2 from the exterior 218 of the electrical enclosure 2.

The example electrical enclosure 200 further includes a number of input terminals 220,222,224 and a number of output terminals 226,228,230. While three input terminals 220,222,224 and three output terminals 226,228,230 are disposed on the top 206 of the cover 204 in the example electrical enclosure 202, it will be appreciated that any known or suitable alternative number and/or configuration of terminals (not shown) could be employed, without departing from the scope of the invention. The circuit breaker 2 (shown in simplified form in hidden line drawing in FIG. 5) includes a number of line terminals 26,28,30 (all shown in FIG. 3) and a number of load terminals 32,34,36 (all shown in FIG. 3). As shown in simplified form in FIG. 5, each of the input terminals (see, for example, input terminal 224 of FIG. 5) of the example electrical enclosure 200 is electrically connected to a corresponding one of the line terminals (see, for example, line terminal 30 of FIG. 5) of the circuit breaker 2. Similarly, each of the output terminals (see, for example, output terminal 230 of FIG. 5) of the example electrical enclosure 200 is electrically connected to a corresponding one of the load terminals (see, for example, load terminal 36 of FIG. 5) of the circuit breaker 2. It will be appreciated that such electrical connection could be provided by any known or suitable electrically conductive member or plurality of electrically conductive members such as, for example and without limitation, the conductors 234, 236 and bus members 40,42, shown in simplified form in FIG. 5. It will also be appreciated that the line and load terminals (e.g., 30,36) could have any know or suitable alternative configuration, without departing from the scope of the invention. For example and without limitation, they could be reversed from the configuration shown and described herein. It will further be appreciated that the electrical enclosure 200 may include additional features such as, for example and without limitation, the auxiliary enclosure 232 shown coupled to the exterior 218 of wall 214 of the electrical enclosure cover 204 in the example of FIG. 5. Such an auxiliary enclosure 232 could, for example and without limitation, house suitable controls (not shown) for the electrical enclosure 200. It will be appreciated that the auxiliary enclosure 232 could alternatively be coupled to any wall (e.g., 208,210,212) other than wall 214.

The intake 120 of the example chimney assembly 100 includes a first duct element 122, which extends through the door 112 toward the poles (see, for example, pole 16 of FIG. 4) of the circuit breaker 2, as shown in FIG. 4. Similarly, the example exhaust 150 includes a second duct element 152, which extends through the door 112 toward the second portion 134 of the duct 130, as shown in FIG. 4. The aforementioned fans 126,156 may, but need not necessarily, be disposed within the first and second duct elements 122,152, respectively. The example intake 120 and exhaust 150 further include a first hood 124 and a second hood 154, respectively. The first hood 124 is coupled to the first duct element 122 at or about the door 112 on the exterior 218 of the electrical enclosure 204, as shown in FIG. 5. Likewise, the second hood 154 is coupled to the second duct element 152 at or about the door 112 on the exterior 218 of the electrical enclosure cover 204. In this manner, the hoods 124,154 function, for example, to further direct the volume of air 300, as described hereinabove, and/or to shield the intake 120 and exhaust 150, for example and without limitation, from rain or other precipitation. It will be appreciated that the chimney assembly 100 and electrical enclosure 200 could be employed in an indoor application as well as outdoors.

Accordingly, the disclosed chimney assembly 100 provides a mechanism for improving the thermal performance of circuit breakers 2.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A chimney assembly for an electrical switching apparatus, said electrical switching apparatus comprising a housing and a number of poles generally disposed within said housing, said chimney assembly comprising:
a frame including a first end, a second end disposed opposite and distal from the first end, a first side and a second side disposed opposite the first side, the first side of said frame being structured to be coupled to the housing of said electrical switching apparatus proximate to said number of poles of said electrical switching apparatus;
an intake disposed proximate the first end of said frame;
a duct including a first portion, a second portion and an intermediate portion disposed between the first portion and the second portion, the first portion of said duct being structured to be coupled to the housing of said electrical switching apparatus above said number of poles, the second portion of said duct being coupled to the first side of said frame; and
an exhaust disposed proximate the second end of said frame opposite from the second portion of said duct,
wherein said chimney assembly is structured to draw a volume of air through said intake into the housing of said electrical switching apparatus, to circulate said volume of air through said number of poles of said electrical switching apparatus, and to discharge said volume of air out of the housing of said electrical switching apparatus through said duct and said exhaust.

2. The chimney assembly of claim 1 wherein the intermediate portion of said duct is disposed at an angle with respect to the first side of said frame.

3. The chimney assembly of claim 2 wherein said angle is less than about 75 degrees.

4. The chimney assembly of claim 1 wherein the second portion of said duct comprises a pair of opposing side walls extending perpendicularly outwardly from the first side of said frame; wherein the intermediate portion of said duct comprises a panel member coupled to said pair of opposing side walls; and wherein said panel member is structured to enclose said duct, thereby forming a passageway for said volume of air to pass from the housing of said electrical switching apparatus to said exhaust.

5. The chimney assembly of claim 1 wherein said intake comprises a first duct element structured to extend from the second side of said frame through said frame toward said number of poles of said electrical switching apparatus; and wherein said exhaust comprises a second duct element extending from the second side of said frame through said frame toward the second portion of said duct of said chimney assembly.

6. The chimney assembly of claim 5 wherein at least one of said intake and said exhaust further comprises a fan; and wherein said fan is structured to facilitate circulation of said volume of air through said number of poles of said electrical switching apparatus.

7. The chimney assembly of claim 5 wherein said intake further comprises a first hood coupled to said first duct element at or about the second side of said frame proximate the first end of said frame; and wherein said exhaust further comprises a second hood coupled to said second duct element at or about the second side of said frame proximate the second end of said frame.

8. The chimney assembly of claim 1 wherein at least one of said intake and said exhaust is removably coupled to said frame.

9. An electrical switching apparatus comprising:
a housing including a top and a plurality of sides extending outwardly from said top, said top having a duct opening;
a number of poles including separable contacts, said number of poles being generally enclosed by said housing beneath said duct opening of the top of said housing;
an operating mechanism structured to open and close said separable contacts; and
a chimney assembly comprising:
a frame including a first end, a second end disposed opposite and distal from the first end, a first side and a second side disposed opposite the first side, the first side of said frame being coupled to said housing proximate said number of poles,
an intake disposed proximate the first end of said frame,
a duct including a first portion, a second portion and an intermediate portion disposed between the first portion and the second portion, the first portion of said duct being coupled to the top of said housing above said number of poles, the second portion of said duct being coupled to the first side of said frame, and
an exhaust disposed proximate the second end of said frame opposite from the second portion of said duct,
wherein said chimney assembly draws a volume of air through said intake into said housing, circulates said volume of air through said number of poles, and discharges said volume of air out of the duct opening of the top of said housing through the duct of said chimney assembly and said exhaust.

10. The electrical switching apparatus of claim 9 wherein the intermediate portion of said duct of said chimney assembly is disposed at an angle with respect to the first side of the frame of said chimney assembly; and wherein said angle is less than about 75 degrees.

11. The electrical switching apparatus of claim 9 wherein the second portion of the duct of said chimney assembly comprises a pair of opposing side walls extending perpendicularly outwardly from the first side of said frame; wherein the intermediate portion of the duct of said chimney assembly comprises a panel member coupled to said pair of opposing side walls; and wherein said panel member encloses said duct, thereby forming a passageway for said volume of air to pass from said housing to the exhaust of said chimney assembly.

12. The electrical switching apparatus of claim 9 wherein the intake of said chimney assembly comprises a first duct element extending from the second side of said frame through said frame toward said number of poles; and wherein the exhaust of said chimney assembly comprises a second duct element extending from the second side of said frame through said frame toward the second portion of the duct of said chimney assembly.

13. The electrical switching apparatus of claim 12 wherein at least one of the intake of said chimney assembly and the exhaust of said chimney assembly further comprises a fan; and wherein said fan facilitates circulation of said volume of air through said number of poles.

14. The electrical switching apparatus of claim 9 wherein said electrical switching apparatus is a circuit breaker; wherein said number of poles is a plurality of poles; wherein said plurality of poles are structured to conduct electrical current; wherein, responsive to said plurality of poles conducting electrical current, said circuit breaker generates heat; and wherein said chimney assembly circulates said volume of air through said plurality of poles, and discharges said volume of air through said exhaust, thereby dissipating said heat.

15. An electrical enclosure comprising:
a base;
a cover coupled to said base, said cover including a top and a plurality of walls extending outwardly from the top of said cover toward said base;
an electrical switching apparatus coupled to said base beneath said cover, said electrical switching apparatus comprising:
a housing,
a number of poles including separable contacts, said number of poles being generally enclosed by said housing,
an operating mechanism structured to open and close said separable contacts, and
a chimney assembly comprising:
a frame including a first end, a second end disposed opposite and distal from the first end, a first side and a second side disposed opposite the first side, the first side of said frame being coupled to the housing of said electrical switching apparatus proximate said number of poles,
an intake disposed proximate the first end of said frame,
a duct including a first portion, a second portion and an intermediate portion disposed between the first portion and the second portion, the first portion of said duct being coupled to said housing above said number of poles, the second portion of said duct being coupled to the first side of said frame, and
an exhaust disposed proximate the second end of said frame opposite from the second portion of said duct,
wherein said chimney assembly draws a volume of air through said intake into the housing of said electrical switching apparatus, circulates said volume of air through the number of poles of said electrical switching apparatus, and discharges said volume of air out of the housing of said electrical switching apparatus through said duct and said exhaust.

16. The electrical enclosure of claim 15 wherein the second side of the frame of said chimney assembly comprises a door; wherein at least one of the walls of said cover includes an opening; wherein, when said electrical switching apparatus is disposed within said electrical enclosure, said door is disposed in the opening of said at least one of the walls of said cover; and wherein said door is movable between an open position for providing access to said electrical switching apparatus, and a closed position.

17. The electrical enclosure of claim 16 wherein said cover has an exterior; wherein the intake of said chimney assembly comprises a first duct element and a first hood; wherein said first duct element extends through said door toward the number of poles of said electrical switching apparatus; wherein said first hood is coupled to said first duct element at or about said door on the exterior of said cover; wherein the exhaust of said chimney assembly comprises a second duct element and a second hood; wherein said second duct element extends through said door toward the second portion of the duct of said chimney assembly; and wherein said second hood is coupled to said second duct element at or about said door on the exterior of said cover.

18. The electrical enclosure of claim 15 wherein at least one of the intake of said chimney assembly and the exhaust of said chimney assembly comprises a fan; and wherein said fan facilitates circulation of said volume of air through the number of poles of said electrical switching apparatus.

19. The electrical enclosure of claim 15 wherein the intermediate portion of the duct of said chimney assembly is disposed at an angle with respect to the first side of the frame of said chimney assembly; and wherein said angle is less than about 75 degrees.

20. The electrical enclosure of claim 15 wherein the top of said cover of said electrical enclosure includes a number of input terminals and a number of output terminals; wherein said electrical switching apparatus is a circuit breaker; wherein said circuit breaker includes a number of line terminals and a number of load terminals; wherein each of said number of input terminals of said electrical enclosure is electrically connected to a corresponding one of said line terminals of said circuit breaker; and wherein each of said number of output terminals of said electrical enclosure is electrically connected to a corresponding one of said load terminals of said circuit breaker.

* * * * *